US009965784B2

(12) United States Patent
Dinardo, Jr. et al.

(10) Patent No.: US 9,965,784 B2
(45) Date of Patent: May 8, 2018

(54) SEND2MOBILE+ IM

(71) Applicants: Jeffrey N. Dinardo, Jr., East Moriches, NY (US); Jeffrey N Dinardo, Sr., Islip, NY (US)

(72) Inventors: Jeffrey N. Dinardo, Jr., East Moriches, NY (US); Jeffrey N Dinardo, Sr., Islip, NY (US)

(73) Assignee: Jeffrey N Dinardo, Jr., Moniches, NY (US)

( * ) Notice: Subject to any disclaimer, the term of this patent is extended or adjusted under 35 U.S.C. 154(b) by 428 days.

(21) Appl. No.: 14/757,134

(22) Filed: Nov. 24, 2015

(65) Prior Publication Data
US 2016/0086244 A1 Mar. 24, 2016

Related U.S. Application Data

(63) Continuation of application No. 13/998,801, filed on Dec. 9, 2013, now Pat. No. 9,218,613.

(51) Int. Cl.
*G06Q 30/00* (2012.01)
*G06Q 30/06* (2012.01)
(Continued)

(52) U.S. Cl.
CPC ......... *G06Q 30/0613* (2013.01); *G06F 21/31* (2013.01); *G06Q 20/322* (2013.01);
(Continued)

(58) Field of Classification Search
CPC ............................ G06Q 30/0613; H04W 4/21
See application file for complete search history.

(56) References Cited

U.S. PATENT DOCUMENTS 8,238,540 B1 * 8/2012 Duva ...................... H04M 3/51
379/265.01
2007/0276739 A1 * 11/2007 Mathew ............. G06Q 30/0601
705/26.1
(Continued)

*Primary Examiner* — Bennett M Sigmond
*Assistant Examiner* — Scott C. Anderson

(57) ABSTRACT

The present invention is an instant message service ("IMS") based interactive information, marketing and sales system, which provides a Merchant or Seller with a means to rapidly and effectively communicate with its customer base in order to facilitate the sale of a product or service from a Merchant's website to a customer via a customer's mobile computing device. The system represented by this invention is a voluntary, opted-in system, by which the customer provides its mobile telephone number or the telephone number of its chosen mobile device and the instant messaging system that the customer is using on its mobile device, to the Merchant or Seller. A customer then requests that the Merchant or Seller forward specific information to the customer concerning a particular product or service being sold by the Merchant or Seller. The present invention permits the customer to request that certain product specific information be transmitted by the Merchant to the customer's mobile computing device via an instant message service ("IMS") message, as soon as said information becomes available.
The present invention permits the Merchant or Seller to transmit a URL link from the Merchant's website to a customer's mobile number via instant message service ("IMS") message transmitted directly from the web site page. Once received, a customer can then interact directly with a Merchant or Seller, from a customer's mobile computing device, via the instant messaging service. This permits a customer to make inquiries about products or services, make offers to purchase or even to enter bids in online auction environments. The present invention permits a Merchant or Seller to forward via instant messaging service (Continued)

Let Me Know Option ("IMS") message, a URL link which contains a short cut Icon to reside on the home page of the customer's mobile computing device, which when clicked, will act as a shortcut to the Merchant's web site. Also, this present invention permits a Merchant or Seller to forward via instant messaging service an instant message containing a URL link, which when selected by a customer permits the customer to immediately purchase a product or service from its mobile computing device.

15 Claims, 14 Drawing Sheets

(51) Int. Cl.
*G06Q 30/02* (2012.01)
*H04W 4/14* (2009.01)
*H04W 12/08* (2009.01)
*H04L 12/58* (2006.01)
*H04L 12/18* (2006.01)
*G06F 21/31* (2013.01)
*G06Q 20/32* (2012.01)
*G06Q 20/36* (2012.01)
*H04L 29/06* (2006.01)
*H04L 29/08* (2006.01)
*H04W 84/12* (2009.01)

(52) U.S. Cl.
CPC ......... *G06Q 20/3255* (2013.01); *G06Q 20/36* (2013.01); *G06Q 30/0258* (2013.01); *G06Q 30/0267* (2013.01); *G06Q 30/0625* (2013.01); *H04L 12/189* (2013.01); *H04L 12/1859* (2013.01); *H04L 12/1895* (2013.01); *H04L 51/38* (2013.01); *H04L 63/0876* (2013.01); *H04L 65/1016* (2013.01); *H04W 4/14* (2013.01); *H04W 4/21* (2018.02); *H04W 12/08* (2013.01); *H04L 67/02* (2013.01); *H04W 84/12* (2013.01)

(56) References Cited

U.S. PATENT DOCUMENTS

2009/0254447 A1\* 10/2009 Blades ................. G06Q 10/083
　　　　　　　　　　　　　　　　　　　　　　　　705/26.1
2014/0134978 A1\* 5/2014 Zitnik ..................... H04L 69/08
　　　　　　　　　　　　　　　　　　　　　　　　455/411

\* cited by examiner

Send2Mobile: QualityDoor.com

Please enter your mobile phone numbers
and/or email address to be signed up for
our exclusive messaging service and to send
the Quality Door Web Application to your Mobile Devices.

First Name:

[          ] ← 1.1

*Please enter your first name.*

Last Name:

[          ] ← 1.2

*Please enter your last name.*

Mobile Phone:

[          ] ← 1.3

*Please enter phone numbers one per line.*

Email Addresses:

[          ] ← 1.4

*Please enter email addresses one per line.*

⌐ 1.5
☐ Check here if you would like the Quality Door Web Application sent to your mobile devices.

[Submit] ← 1.6

Figure 1

Thank You! ← 2.1

You have been signed up for our exclusive messaging service!

Figure 2

Send2Mobile Administrator Panel: QualityDoor.com

Please enter the mobile phone numbers
to send the page to.

Mobile Phone:

⟵ 4.1

*Please enter phone numbers one per line.*

[Submit] ⟵ 4.2

Figure 4

Send2Mobile Visitors Panel: QualityDoor.com

Please enter the mobile phone numbers
to send this page to.

First Name:

[_____] ← 6.1

Please enter your first name.

Last Name:

[_____] ← 6.2

Please enter your last name.

Mobile Phone:

[                    ] ← 6.3

Please enter phone numbers one per line.

☐ Check here if you would like to use Let Me Know ← 6.4

[ Let Me Know When... ⇕ ] ← 6.5

[ Submit ] ← 6.6

Figure 6

| FirstName | LastName | Phone | Email | Type | ProductNumber |
|---|---|---|---|---|---|
| John | Smith | 7275555555 | john@mail.com | Price | 7451258963 |
| Jane | Doe | 9005553333 | janed@email.com | Sold | 2658741269 |
| Kevin | Everyman | 3789999999 | kevin@email.net | Bid | 3584621654 |
| Tim | Johnson | 2928888888 | tim@emails.com | Stock | 6846213845 |
| Ethan | Brown | 2223335555 | ebrown@email.com | Price | 5621858513 |

Figure 14

SEND2MOBILE+ IM

BACKGROUND OF INVENTION

1. Field of Invention

This invention relates to a marketing, information and sales system by which businesses, institutions, individual sellers and organizations can market to, electronically interactively communicate with and eventually sell a product or service to a highly targeted, voluntarily opted-in group of customers via the use of instant messaging services ("IMS") messages provided by the Merchant or Seller to a customer's mobile computing device capable of receiving and sending instant messages.

2. Description of Related Art

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light only, and not as admissions of prior art.

Currently, there exists the ability to display instant messages (IM) on all mobile computing devices. This invention envisions the use instant messaging as a means of direct marketing; advertising of goods and services; notice of events; communication of alerts; reminders of appointments and platforms for special offers, coupons; links to informational sites; interactive communications between Merchant or Seller and customers; means to facilitate the sale of products and services for immediate purchase from a mobile computing device; and a means to conduct and participate in online auctions and bidding through instant messaging via a mobile computing device.

Available statistics within the industry evidence that the average mobile phone user looks at their mobile phone 150 times a day. The same survey indicates that 95% of instant messages are read within the first 5 minutes after receipt and that the average redemption rate for mobile coupons is at 20%. With the significant growth of the mobile phone market and the general acceptance and common use of instant messaging, there is a defined opportunity for the use of the technology represented by this present invention.

It is crucial to understand that the present invention utilizes what is commonly referred to in the industry as an "opt-in" service and so it is the mobile phone user who actually agrees and initiates the service represented by this invention. In this way, the invention is truly user friendly. Unsolicited instant messages, commonly referred to as "spam", are highly regulated and are generally looked upon as a nuisance within the mobile phone industry. Therefore, the "opt-in" embodiment of the present invention, effectively and legally overcomes that negative factor and "spam" problem.

As compared to other types of direct marketing such as direct mailers; e-mail advertising and telephone solicitations, the instant messaging ("IM") marketing and sales system embodied by this invention provides the consumer with a quick, convenient and simple method of response utilizing instant messaging capabilities on their mobile computing devices. Typical mobile phone users are in constant possession of their phones as they go about the business of their day. The instant message, which arrives on their mobile computing device therefore, will be most likely attended to in the first 5 minutes after receipt and can be responded to in a quick, convenient and simple fashion, for example by calling a number or clicking a URL link to redeem a coupon, make a reservation, confirm an appointment or even to make a direct and immediate purchase or enter a bid or counter-offer within an online auction environment.

The instant messaging marketing and sales system made possible by this invention is: (1) first and foremost "permission based", that is that the instant message ("IM") will only be sent to customers who have previously "opted-in" to receive such IM messages; (2) a mass communication tool because of the high percentage of consumers who currently use mobile phones or mobile computing devices capable of receiving instant messages ("IM"); (3) instantaneous, since an instant message can be sent in a matter of seconds or can be programmed to be delivered at the exact time and date to be most likely read by the consumer; and (4) interactive because it permits the customer to immediately respond to the instant message forwarded via this present invention.

BRIEF SUMMARY OF THE INVENTION

The present invention is an instant messaging service ("IMS") based interactive information, marketing and sales system, which provides a Merchant or Seller with a means to interactively communicate with its customer base. The system represented by this invention is a voluntary, opted-in system, by which the customer provides its mobile telephone number or the telephone number of its chosen mobile computing device and the customer's chosen instant messaging service, to the Merchant or Seller and requests that the Merchant or Seller forward marketing, promotional and informational materials to the customer. The present invention permits the customer to request that certain product specific information be transmitted by the Merchant or Seller to the customer via instant messaging service ("IMS") messages, as soon as said information becomes available. The present invention permits both the Merchant or Seller and the customer to transmit a URL link from the Merchant's website to a mobile number via instant message service ("IMS") message directly from the web site page. The present invention permits the Merchant or Seller to forward via instant message ("IM") a short cut Icon to reside on the home page of the customer's mobile phone or mobile computing device, which when clicked, will act as a shortcut to the Merchant's web site. The present invention also permits the Merchant or Seller to forward via instant message ("IM") a URL link, which when selected by the customer, will permit the customer to immediately purchase a product or services directly from its mobile computing device.

BRIEF DESCRIPTION OF THE DRAWINGS

These and other features, aspects and advantages of the present disclosure will become better understood when the following detailed description is read with reference to the accompanying drawings in which like characters represent like parts throughout the drawings, wherein:

FIG. 1 is a view of the pop-up screen, which appears on the customer's device prompting the customer to enter certain identifying and contact information.

FIG. 2 is a view of the pop-up screen, which appears on the customer's device, alerting the customer that he/she has successfully opted-in to the Merchant's messaging services offered in accordance with the embodiment.

FIG. 4 is a view of the Merchant's Administration Panel, located on the back-end of the Merchant's website, accessible only to the Merchant secured by passcode and pin number, permitting the Merchant to enter the opted-in customer's mobile number in accordance with one embodiment.

FIG. 6 is a view of a pop-up screen, which appears on the customer's mobile computing device and permits the opted-in customer to submit his/her name; mobile number(s), and chosen instant messaging service and to select if the customer chooses to use the "Let Me Know" feature of the present disclosure, in accordance with one embodiment.

FIG. 14 is a view of the Let Me Know Administration File, which is located on the back-end of the Merchant's website, accessible only to the User and which contains the opted-in customer's name, mobile number(s), e-mail address, chosen instant messaging service, Let Me Know request item and specific product number, all in accordance with one embodiment.

DETAILED DESCRIPTION OF SPECIFIC EMBODIMENTS

One or more of the specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made in order to achieve the developers' specific goals, such as compliance with system related and business related constraints, which may vary from implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure is directed to obtaining a customer's permission by way of an opt-in procedure, to forward to said customer, via "instant message services" ("IMS") message, product or services information, pricing information, special sale and discount information, availability of product or services information, coupons for the purchase of products or services, a URL link to Merchant's landing page and product pages, the ability of customer to send a URL link to Merchant's landing page and product pages to other mobile computing devices; the Merchant's ability to forward to a URL link to customer's mobile computing device to permit the customer to make an immediate purchase of a product or service, via instant message services (IMS) messages.

Figure 7:
FIG. 7 is a view of the pop-up screen identified previously in FIG. 6 and show in detail, the drop down selection menu available to the opted-in customer to select in order for the customer to choose an item which customer would opt for the Merchant to inform the customer about by future instant message, as the item or information becomes available to the Merchant, in accordance with one embodiment.
Figure 8:
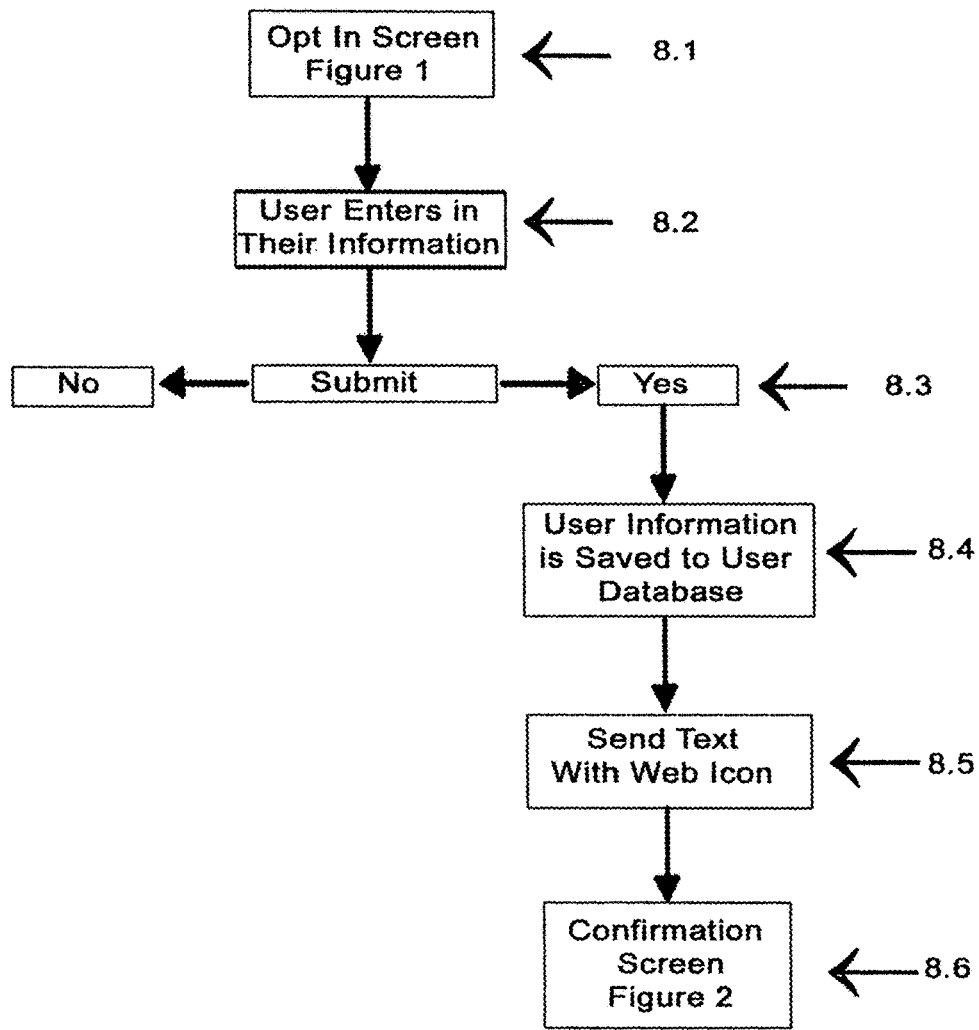
FIG. 8 is a flow chart, which demonstrates the workings of the "Opt-In Procedure" of the present disclosure, in accordance with one embodiment.
Figure 9:
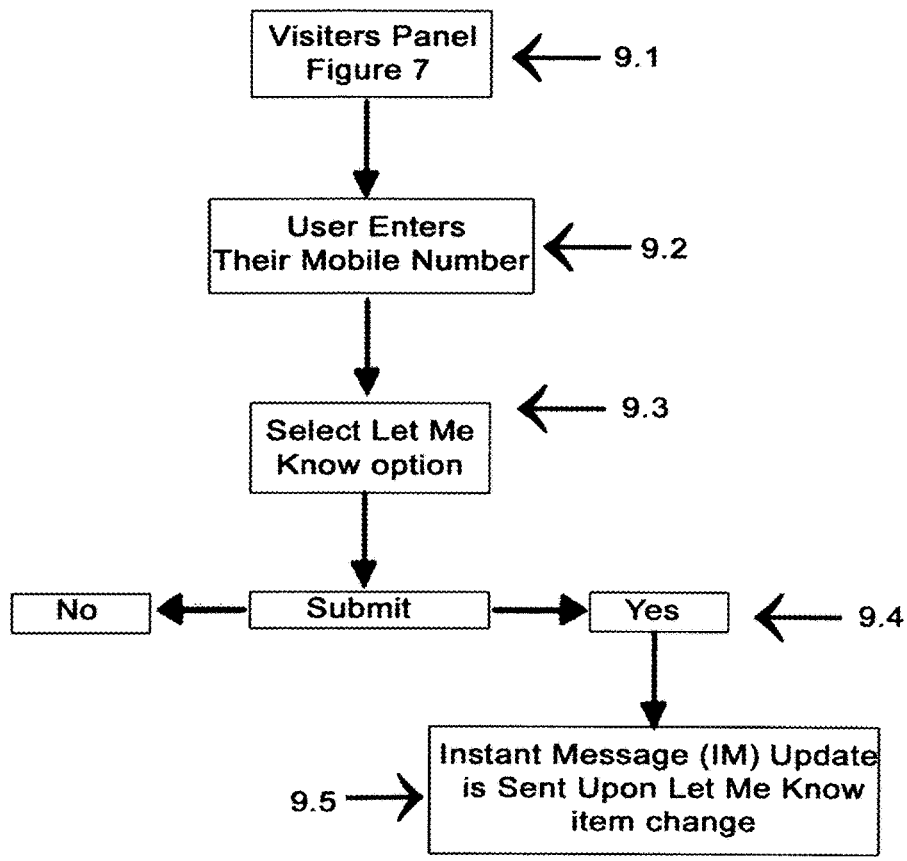
FIG. 9 is a flow chart, which demonstrates the workings of the "Let Me Know Procedure" of the present disclosure, in accordance with one embodiment.
Figure 10:
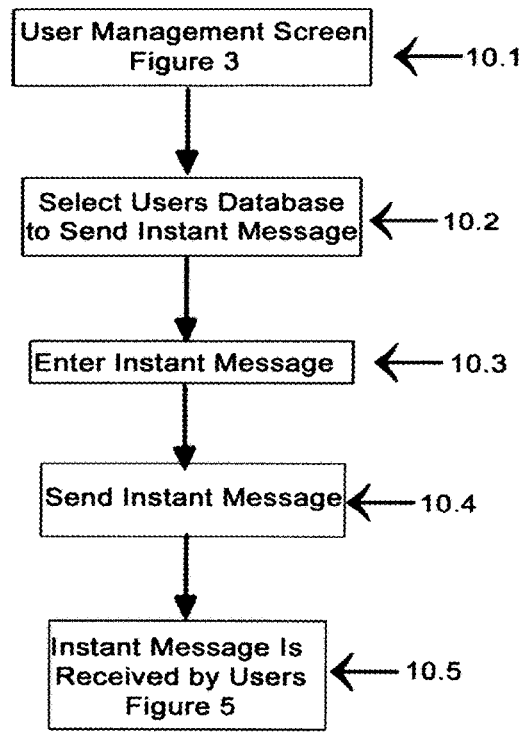
FIG. 10 is a flow chart, which demonstrates the workings of the "Instant Messaging Marketing Procedure" in the present disclosure, in accordance with one embodiment.

FIG. 1 and FIG. 7 illustrate the techniques utilized for the customer "opt-in" procedure to the Merchant's web-based instant messaging ("IM") system. On the Merchant's web site landing page, each product page and on the check-out page, the customer will view a S2M icon. When the customer clicks on the S2M icon, a pop-up screen will appear, as illustrated in FIG. 1, which will prompt the customer to choose to enter their name, mobile telephone number(s) and e-mail address(es). If the customer elects not to enter the information requested, the pop-up window will close and the opt-in procedure is ended.

FIG. 1. If the customer elects to enter the information requested, the information is entered into the pop-up window form: FIG. 1.1 First Name; FIG. 1.2 Last Name; FIG. 1.3 Mobile Phone Number(s); FIG. 1.4 E-mail Address(es); FIG. 1.5 and the Merchants's Web Application Icon link is sent to customer's mobile computer device home screen.

Figure 3:
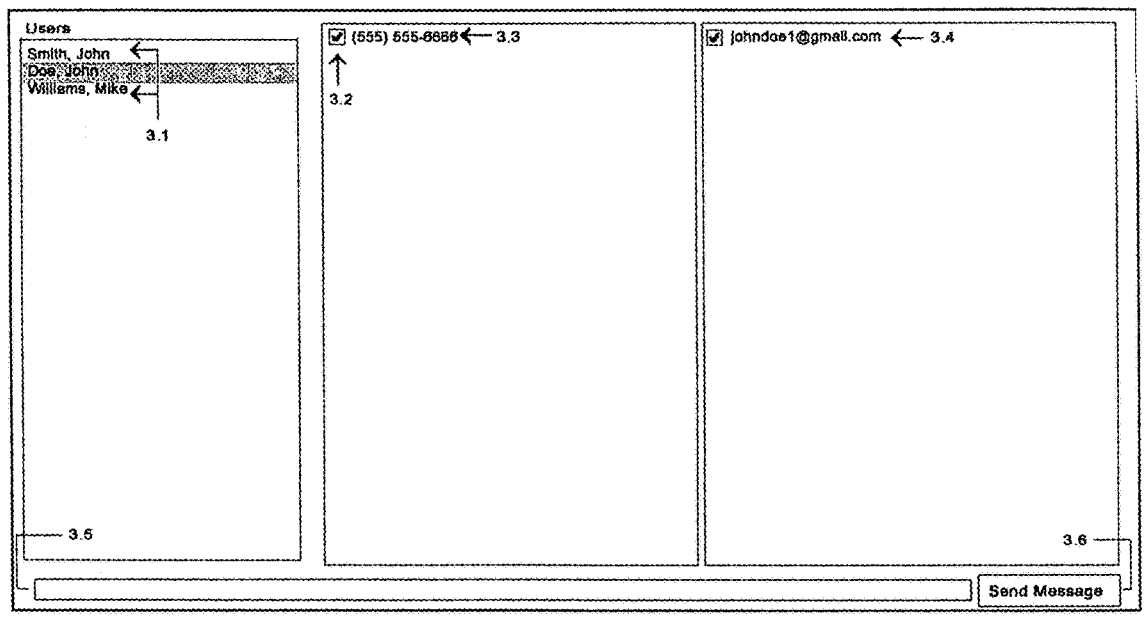
FIG. 3 is a view of the Merchant's Administration File, which stores the opted-in customer's name, mobile telephone number(s) and e-mail address and choice of instant messaging service in accordance with one embodiment.

After the customer has entered its information onto the pop-up window form, FIG. 1, the information collected is then sent to and stored in the Merchant's Administration File, FIG. 3, and if the customer elected, the User's Web Application short-cut Icon is sent by instant messaging service (IMS) to customer's mobile computing device. The customer receives a confirmation of the successful opt-in by instant messaging service (IMS) FIG. 2.1. The customer can then, from that point forward, directly access the Merchant's web site by selecting the Merchant's Web Application short-cut Icon from the mobile computing device home screen.

Once the customer has been opted-in to the system and the customer's information is stored in the Merchant's Administration File, the Merchant can communicate with and directly market to, the customer by using instant messaging services ("IMS") to market its products by specific product announcements, sales, mobile coupons and/or other types of direct marketing offers.

Figure 13:
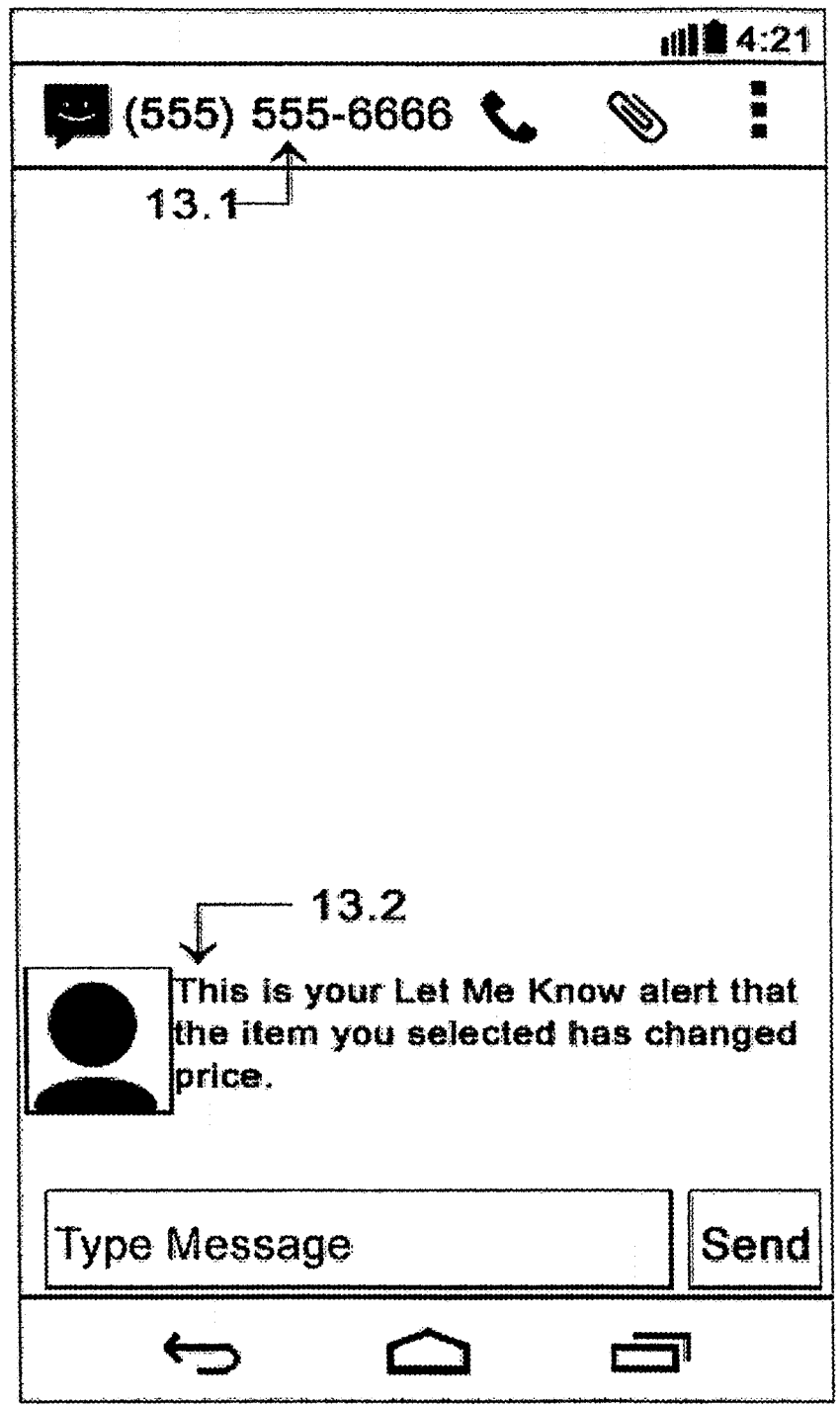
FIG. 13 is a view of the pop-up screen which appears on the opted-in customer's mobile computing device alerting the customer by instant message sent by the Merchant, that the product or information requested by the customer in the Let Me Know feature is available, in accordance with one embodiment.

In the next depicted embodiment, the customer, from the pop-up window screen FIG. 6, can elect to request that the Merchant inform the customer of a specific event regarding a product or service, by choosing from a drop-down menu, FIG. 7.1; FIG. 7.2; FIG. 7.3; FIG. 7.4; FIG. 7.5. Once customer selects the notification option, which is called the Let Me Know" option from the drop down menu, the selection is saved and sent to the Merchant's Let Me Know Administration File, FIG. 14, where it is matched with the customer's stored contact information from the customer's prior opt-in registration in the Merchant's Administration File. The customer receives a confirmation of its selection, FIG. 13.2, FIG. 2. Once the customer's chosen event from the Let Me Know option takes place, for example: a product price reduction; a new product version update is released; or a different color for the product comes into stock, the customer is notified of the event by instant message service (IMS) message, FIG. 13.1; FIG. 13.2.

In another embodiment, the Merchant is able to send a web-based instant message service (IMS) message to a customer who has previously elected to opt-in to the system and whose contact information has been stored to the Merchant's Administration File, FIG. 3.1.

Figure 5:
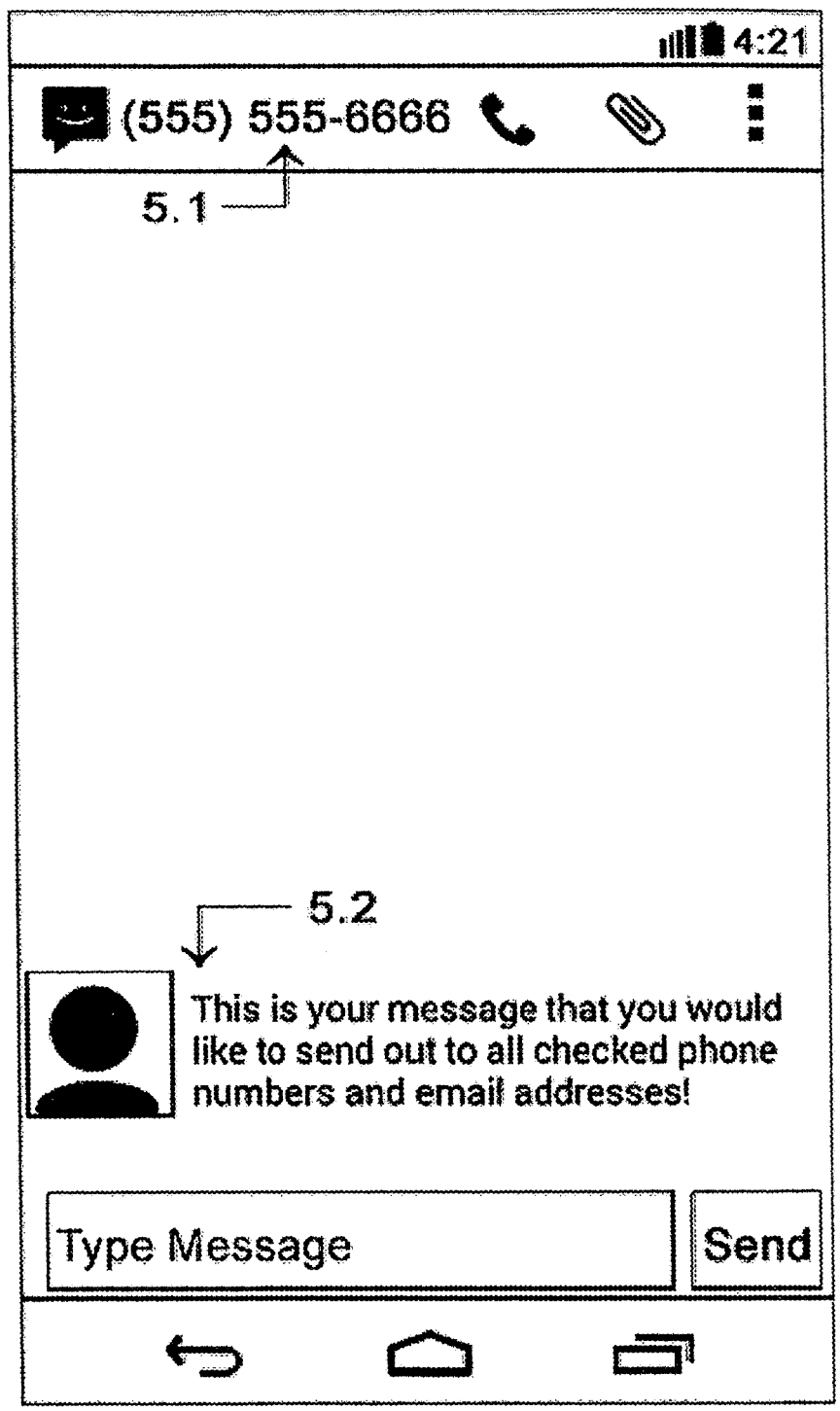
FIG. 5 is a view of the pop-up screen, which appears to the Merchant and permits the Merchant to send an instant message to one or more opted-in customers, in accordance with one embodiment.

The Merchant will utilize the provided back-end web site Administration Panel, FIG. 3; FIG. 14 to select the customer name and corresponding mobile number(s) and selected instant messaging service to send the desired communication, FIG. 3.1; FIG. 3.2; FIG. 3.3; FIG. 3.4. A pop-up window in the provided back-end Merchant's Administration Panel, FIG. 3; will allow the Merchant to enter the customers' phone number, FIG. 4.1, enter the desired message, coupon code, marketing, information notification, etc. and send the desired instant message (IM), FIG. 5.2, by web based instant message service ("IMS") to customer's mobile computing device. The customer will receive the instant message service ("IMS") communication to its previously opted-in and provided mobile telephone number, FIG. 1.3; FIG. 6.3.

Figure 11:
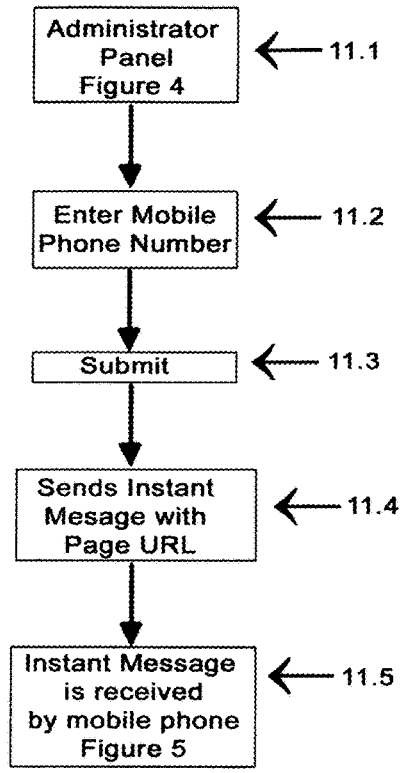
FIG. 11 is a flow chart, which demonstrates the workings of sending a URL by instant message ("IM") from the Merchant's website to the opted-in customer, by the Merchant, in accordance with one embodiment.

In another embodiment, the Merchant can send, via web based instant message service ("IMS"), a specific URL to a customer who has previously elected to opt-in to the system and receive IMS messages. The URL can be a link to the landing page, the check-out page or any product page contained in the Merchant's web site, FIG. 11. The Merchant will utilize the provided Administration Panel, FIG. 3, to access the customer name and corresponding mobile telephone number(s).

The Merchant will then enter the customer's mobile telephone number(s), FIG. 4.1, add the URL link to the send instant message box, FIG. 3.5 and chose send instant message. FIG. 3.6. The customer will then receive the URL link, via instant message service ("IMS") to its previously opted-in and provided mobile telephone number, FIG. 1.3; FIG. 6.3.

Figure 12:
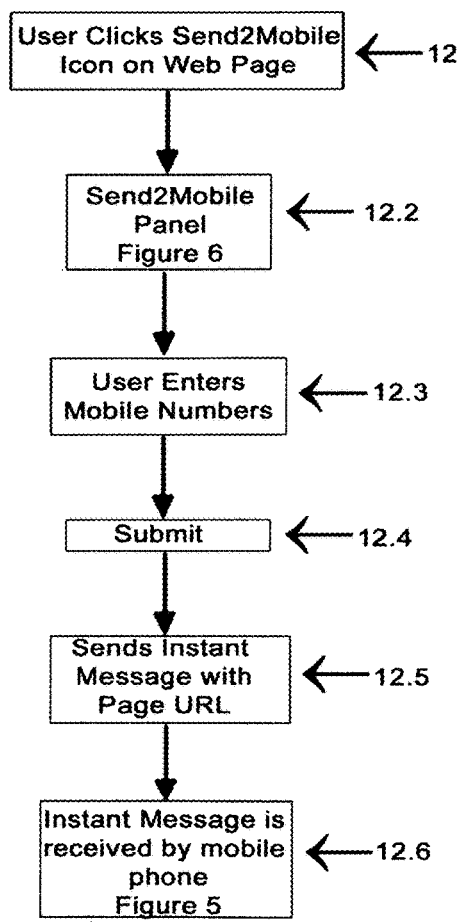
FIG. 12 is a flow chart, which demonstrates the workings of sending a URL by instant message ("IM") from the Merchant's website by the opted-in customer to another contact of the customer's choice, in accordance with one embodiment.

In another embodiment, the customer, who has previously opted-in to the Merchant's system, can send, via web based instant message service ("IMS") message, a URL link to the Merchant's landing page or any product page, to the mobile telephone number of a friend, relative or business contact via instant messaging. The customer will click on the S2M Icon, which will be located on every product page; the landing page and the check-out page of the Merchant's web site, FIG. 12.1. Clicking on the S2M+ Icon will cause a pop-up window to appear, FIG. 6, FIG. 12.2 and the customer will enter the mobile number of its desired recipient, FIG. 12.3 and then enter "Submit", FIG. 12.4. The URL link for that particular product page, landing page or check-out page will then be transmitted to the customer's desired recipient via instant message service ("IMS") message to the previously entered mobile number, FIG. 12.5; FIG. 12.6.

What is claimed is:

1. A method of facilitating the sale of a product or service from a merchant's internet server via interactive instant messaging services messages communicating with a customer's mobile computing device capable of sending and receiving instant messages (IM), comprising:
    installing and executing an application on the merchant's internet server, which comprises a microprocessor, memory, and a communications interface, the application including code for causing the microprocessor to display a selectable icon in a merchant's webpage stored in the memory of the merchant's internet server, wherein when the icon is selected by a customer from a customer's computing device, a screen is displayed prompting a customer to enter customer identification information, a mobile number and the instant messaging service the customer is subscribed to, and including a submit button, which, when selected by the customer, transmits the customer identification information, the customer's mobile number and the customer's instant messaging service to the merchant's internet server, the customer identification information, mobile number and customer's instant messaging service being written to a customer database residing in the merchant internet server's memory to then be used for interacting with the customer via instant messaging;
    displaying on a merchant's webpage a graphical user interface including one or more of a plurality of data fields, which include events determined by a merchant inviting responses from a customer, the events and responses corresponding to a product or service being sold on a merchant's website, for which the customer wishes to be timely notified via instant message sent to the customer's mobile computing device;
    receiving the customer's selection of the event corresponding to a product or service being sold on the merchant's website from the customer's mobile computing device and storing the event in the memory of the merchant's internet server;
    determining, by the application running on the microprocessor of the merchant's internet server, when such an event has occurred;
    generating an instant message including text indicating that the event has occurred and displaying a universal resource locator (URL), which when selected by a customer causes an immediate purchase of the product or service being sold on the merchant's website, when the merchant's internet server determines that the event has occurred;
    the application further including code causing the communication interface of the merchant's internet server to transmit the instant message (IM) to the customer's mobile computing device using the customer's mobile number and the customer's instant messaging service, immediately after the merchant's internet server determines that the event has occurred;
    receiving, at the customer's mobile computing device, the merchant's generated instant message (IM) which displays the URL, which when selected by the customer causes an immediate purchase of the product or service being sold on the merchant's website; and
    transmitting the customer's immediate purchase of the product or service being sold on the merchant's website from the customer's mobile computing device when the customer selects the URL in the received instant message (IM) or transmitting a customer's instant message (IM) to the merchant requesting additional information or making an offer corresponding to the product or service being sold on the merchant website.

2. The method according to claim 1, wherein interactive messaging communication with a customer's mobile device capable of sending and receiving messages is via Extensible Messaging and Presence Protocol (XMPP).

3. The method according to claim 1, wherein interactive messaging communication with a customer's mobile device capable of sending and receiving messages is via Instant Messaging and Presence Protocol (IMPP).

4. The method according to claim 1, wherein interactive messaging communication with a customer's mobile device capable of sending and receiving messages is via Application Exchange Protocol (APEX).

5. The method according to claim 1, wherein interactive messaging communication with a customer's mobile device capable of sending and receiving messages is via Apple Push Notification Protocol (APN-i-Message).

6. The method according to claim 1, wherein interactive messaging communication with a customer's mobile device capable of sending and receiving messages is via Session Initiation Protocol (SIP).

7. The method according to claim 1, wherein interactive messaging communication with a customer's mobile device capable of sending and receiving messages is via SIP for Instant Messaging and Presence Leveraging Extensions (SIMPLE).

8. The method according to claim 1, wherein interactive messaging communication with a customer's mobile device capable of sending and receiving messages is via MQ Telemetry Transport Protocol (MQTT).

9. The method according to claim 1, wherein the instant message is a Multimedia Message Service message (MMS).

10. The method according to claim 1, wherein the instant message is a Short Message Service message (SMS) via a wireless local area network (WLAN).

11. The method according to claim 1, wherein the instant message is a Multimedia Message Service message (MMS) via a wireless local area network (WLAN).

12. The method according to claim 1, wherein a merchant comprises any individual or company which sells a product or service to another for a wholesale or retail price via a direct purchase or via a public sale to a highest bidder.

13. The method according to claim 1, wherein a customer comprises any individual or company which buys a product or service from another for a wholesale or retail price via a direct purchase or via a public sale to a highest bidder.

14. The method according to claim 1, wherein the merchant's internet server is a private cloud server, which comprises a microprocessor, memory and communications interface utilizing a cloud computing platform, and an operating system-level virtualization method programmed to perform the method.

15. The method according to claim 14, wherein the operating system-level virtualization method is programmed to include a digital portal, wherein said digital portal is a personal digital portal comprising a means for permitting a prior authenticated and authorized customer to push information to its personal digital portal and to engage in interactive communication with merchants, selected personal contacts and other authorized customers via instant messaging services.

* * * * *